Figure 1:
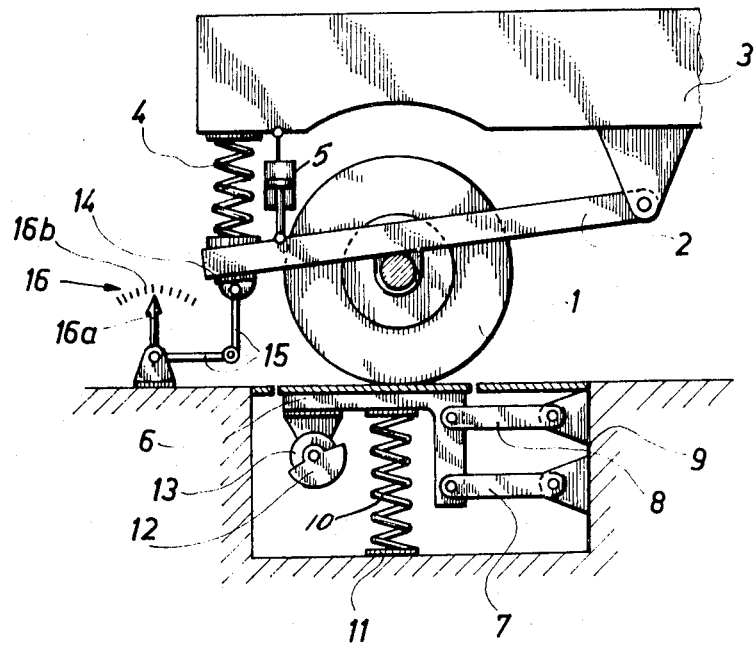

United States Patent
Kiefer

[11] 3,720,091
[45] March 13, 1973

[54] TESTING DEVICE FOR TESTING OSCILLATION ABSORBERS OF VEHICLES

[76] Inventor: Heinz Kiefer, Haydnstrasse 5, 776 Radolfzell, Germany

[22] Filed: Jan. 11, 1971

[21] Appl. No.: 105,676

Related U.S. Application Data

[63] Continuation of Ser. No. 797,142, Jan. 6, 1969, abandoned.

[52] U.S. Cl.............................................73/11, 73/71.7
[51] Int. Cl.................................................G01m 17/04
[58] Field of Search...............73/11, 71.5, 71.6, 71.7

[56] References Cited

UNITED STATES PATENTS 2,934,940  5/1960  Beissbarth................................73/11
2,305,783  12/1942  Heyman et al....................73/71.6 UX
2,995,934  8/1961  Adams et al........................73/71.6 X
3,520,180  7/1970  Polhemus et al.......................73/71.7

FOREIGN PATENTS OR APPLICATIONS 1,232,372  1/1967  Germany.....................................73/11

Primary Examiner—Charles A. Ruehl
Attorney—Walter Becker

[57] ABSTRACT

An apparatus for checking vehicle shock absorbers in installed condition which comprises vertically oscillatable plate means for receiving and supporting a vehicle wheel, said plate means being adapted to be subjected to oscillations for causing the wheel axle mass to carry out sympathetic vibrations the amplitudes of which are measured by a gauge.

3 Claims, 2 Drawing Figures

Inventor:
Heinz Kiefer

TESTING DEVICE FOR TESTING OSCILLATION ABSORBERS OF VEHICLES

This is a continuation of application Ser. No. 797,142 filed Jan. 6, 1969, now abandoned.

The present invention relates to a device for checking vehicle shock absorbers in installed condition according to which the vehicle wheel rests on a vertically oscillating plate which latter when actuated subjects the mass of the axle to sympathetic vibrations the amplitudes of which are indicated on a measuring device.

With a heretofore known testing or checking device, the plate is actuated by means of a crank drive which subjects the spring system of the vehicle to oscillations. The tire of the wheel serves as spring which transmits the oscillations. A writing device the writing or registering part of which is connected to the wheel registers the amplitudes of the wheel while the magnitude of said amplitudes is to indicate the condition of the shock absorber.

A device of the above mentioned type has the drawback that in view of the spring characteristic of the tire, the resonance frequency of the system is relatively high so that a correspondingly high driving power is required. A further drawback consists in that with rigid axles, in view of the high resonance frequency, the entire spring system of an axle may get into a condition of coupled oscillations so that a proper indication concerning the condition of the individual shock absorber is impossible. The above device has still another drawback which consists in that the crank drive has to absorb the entire load of the wheel on the plate. The journalling of the crank drive has, therefore, to be designed rather heavy and expensive.

There has also become known a device for checking the efficiency of shock absorbers on vehicles in installed condition, according to which an additional elastic member is arranged between the wheel support and the drive therefor. While this device overcomes the drawbacks of high resonance frequency of the system and eliminates the influence of different tire properties, such as inflating pressure, degree of wear or construction of the tire, on the measuring system, it still has the drawback that the drive has to absorb the entire wheel load.

It is, therefore, an object of the present invention to provide a device for testing and checking vehicle shock absorbers, which will overcome all of the above mentioned drawbacks.

It is another object of this invention to provide a device as set forth above which will be rather simple in construction and highly reliable in operation.

These and other objects and advantages of the invention will appear more clearly from the following specification in connection with the accompanying drawing, in which:

FIG. 1 diagrammatically illustrates a device according to the invention in which the rotating mass as well as the motor are arranged directly on the plate supporting the wheel.

Figure 2:
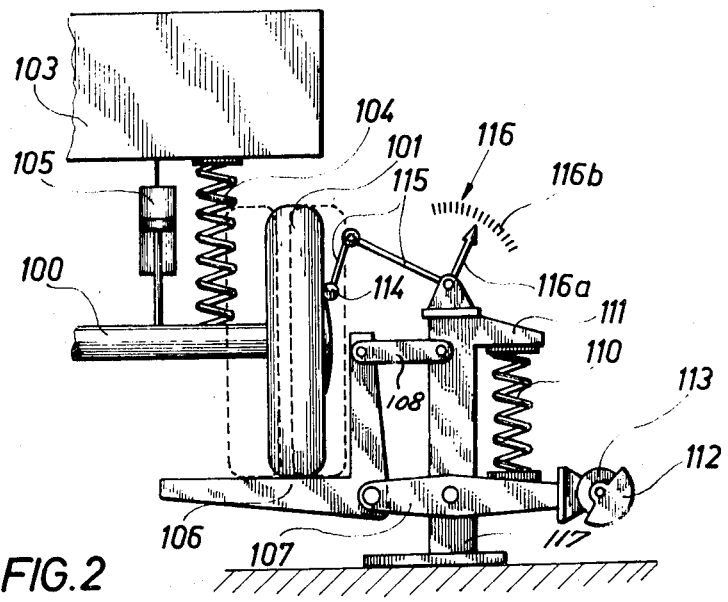

FIG. 2 is a diagrammatic illustration of a device according to the invention, in which the motor driven mass is mounted on a link member which serves simultaneously for guiding the plate, the dash line illustration of the wheel indicating different wheel bases of the vehicle.

The device according to the present invention is characterized primarily in that the plate supporting the wheel is directly or through the intervention of a link member by means of an additional spring supported by a fixed bearing and is subjected to oscillations by means of a motor driven oscillating or rotating mass.

With an arrangement according to the present invention, the load of the wheel is through the intervention of a spring absorbed by a fixed bearing. The necessary power and costs for the journalling of the drive can, therefore, be considerably reduced over heretofore known devices of the type involved.

Under certain structural conditions, it may be advantageous to arrange the oscillating or rotating mass as well as the motor directly on the plate. Other circumstances may require an arrangement according to which the motor driven mass is expediently mounted on a link member which simultaneously serves for guiding the plate. Both solutions require that the motor and the motor driven mass are not directly coupled to each other.

The measuring device or indicating gauge may be actuated by a linkage system which, in a manner known per se, is by means of a permanent magnet connected to the vehicle wheel or to other parts of the wheel axle. In this way the device can be set up for checking at a very low cost. Moreover, a measuring device closed in itself may be employed the place of installment of which may be selected in conformity with the respective requirements.

According to a further development of the invention, it is suggested that for testing of a shock absorber respectively associated with a vehicle axle, one checking device each be provided on each vehicle side respectively at a spacing approximating the wheel base of the vehicle. Each respective plate means has a width considerably wider than the width of the gauge of a small car to one side thereof so as to be able also to accommodate vehicles with a considerably wider gauge. In this way it is not necessary to turn the vehicle around for checking the shock absorbers respectively associated with one vehicle axle each.

In order to be able to move vehicles with different wheel base to the testing station without laterally displacing the checking device and without having to align the vehicle, it is suggested that the respective width of the respective plate is so selected that vehicles of different wheel base can be received.

Referring now to the drawing in detail, in the arrangement shown in FIG. 1, the wheel 1 is by means of a longitudinal link 2 connected to the vehicle body 3. The link 2 rests against the vehicle body 3 through the intervention of a helical spring 4. Parallel to said spring 4 there is provided a shock absorber 5 the function of which in installed condition is to be checked and tested. As will be seen from the drawing, wheel 1 rests on a plate 6 which by means of links 7 and 8 is linked to a foundation 9 in such a way that while being supported by a spring 10 the plate can oscillate in a vertical direction. Spring 10 rests on the stationary bearing 11 on the foundation 9. Plate 6 is subjected to oscillations by means of a rotating mass 12. The driving motor 13 for rotating said mass 12 is directly connected to the plate 6. This plate, when subjected to oscillations, subjects the spring system of the vehicle to sympathetic vibrations the amplitudes of which are by means of a permanent magnet 14 connected to the link 2 conveyed to the measuring device 16 through the intervention of the linkage system 15. The measuring device or gauge 16 comprises a pointer 16a and a scale 16b. The magnitude of the amplitudes indicates the functions or properties of the shock absorber 5.

According to the embodiment of FIG. 2, an axle 100 carries a wheel 101 and through the intervention of a helical spring 104 supports the vehicle body 103. Provided in parallel arrangement to the spring 104 and arranged between the axle 100 and the vehicle body 103 is a shock absorber 105. The wheel 101 rests on a plate 106 which is linked by links 107 and 108 to a frame structure 117 and is adapted to oscillate in vertical direction. A fixed bearing 111 on the frame structure 117 absorbs the load exerted by a spring 110 which through the intervention of the link 107 supports the plate 106. On that end of the link 107 which is located opposite the plate 106, there is arranged the rotating mass 112 the driving motor 113 of which is connected to the link 107. A linkage 115 which by means of a permanent magnet 114 is connected to the wheel 101 transmits the amplitudes of the sympathetic vibrations conveyed by the oscillating plate 106 to the spring system of the vehicle to the measuring device or gauge 116 provided with a pointer 116a and a scale 116b.

The masses 12 and 112 which for the sake of simplicity have been shown as rotating mass, may, of course, be replaced by oscillating masses if, for instance, the bearings for the links are to be relieved from out of balance forces which act perpendicularly to the direction of oscillation of the plate.

It is, of course, to be understood that the present invention is, by no means, limited to the particular constructions shown in the drawing but also comprises any modifications within the scope of the appended claims.

I claim:

1. An apparatus for individually checking a shock absorber installed on a vehicle equipped with an axle and wheel and having a shock absorber associated with vehicle spring means, comprising a fixed base, a support member for supporting a single wheel of said vehicle and its axle, means to support said support member on said fixed base for vertical movement, including a spring having one end in fixed engagement with a part of said fixed base and its opposite end connected to said means to support said support member to resist vertical movement of said support member, means to vibrate said support member including a movable mass connected to said means to support said support member and mounted for movement of its center of mass relative to said support member, and means to drive said mass cyclically to set up vertical oscillations of said support member, so as to vibrate the vehicle wheel and to subject the axle mass to sympathetic vibrations, and indicating means operatively connectable to said axle mass for indicating the amplitude of said sympathetic vibrations.

2. A stand for individually checking shock absorbers of a vehicle having axle means supported on wheels at each end and equipped with shock absorbers associated with vehicle springs, which comprises two checking devices spaced from each other so as to define therebetween a distance approximately corresponding to the tread gauge of a vehicle with the smallest tread gauge the shock absorbers of which are to be checked, each of said checking devices including a separate support member operable to receive and support a vehicle wheel and its axle, said support member extending outwardly laterally sufficiently to accommodate to axles and wheels of vehicles having tread gauges greater than said smallest tread gauge, a fixed base for each support member, means to support each of said support members on a fixed base for vertical movement including a spring having one end in fixed engagement with a part of said fixed base and its opposite end connected to said support member to resist vertical movement of said support member, means to vibrate each support member including a movable mass connected to each support member and mounted for movement of its center of mass relative to said support member and means to drive said mass cyclically to set up vertical oscillations of said support member, so as to vibrate the vehicle wheel on said support member and to subject the axle mass to sympathetic vibrations, and indicating means operatively connected to said axle mass for indicating the amplitudes of said sympathetic vibrations.

3. A stand according to claim 2, in which said indicating means comprises a linkage operating system including a permanent magnet means which may be magnetically connected to the axle mass of the vehicle.

* * * * *